United States Patent [19]
Nienart et al.

[11] 3,908,038

[45] Sept. 23, 1975

[54] THERMOPLASTIC MOLDING COMPOSITIONS

[75] Inventors: Louis F. Nienart, Elizabeth; Ralph R. Saunders, Dover; Paul Jeges, Carteret, all of N.J.

[73] Assignee: Allied Chemical Corporation, New York, N.Y.

[22] Filed: Dec. 26, 1974

[21] Appl. No.: 536,517

Related U.S. Application Data

[63] Continuation-in-part of Ser. No. 345,634, March 28, 1973, abandoned.

[52] U.S. Cl. .................... 427/27; 161/189; 252/12; 260/42.27; 260/857 UN; 427/336
[51] Int. Cl.² ... C08K 3/20; C08K 3/36; C10M 7/28
[58] Field of Search ............... 117/93.4 R, 93.4 NC; 260/42.27, 857 UN; 252/12; 427/27

[56] References Cited
UNITED STATES PATENTS

| | | | |
|---|---|---|---|
| 2,849,414 | 8/1958 | Stott | 252/12 |
| 2,975,128 | 3/1961 | Stott | 252/12 |
| 3,126,339 | 3/1964 | Stott | 252/12 |

FOREIGN PATENTS OR APPLICATIONS

| | | | |
|---|---|---|---|
| 1,163,950 | 9/1969 | United Kingdom | 252/12 |

Primary Examiner—James H. Derrington
Attorney, Agent, or Firm—Ernest D. Buff; Arthur J. Plantamura

[57] ABSTRACT

A thermoplastic molding composition comprising (1) a polyamide, (2) polytetrafluoroethylene and (3) an inert filler selected from the group consisting of silica and magnesium oxide is provided. The composition can be pressed and sintered, injection molded, compression molded, extruded or readily applied to a substrate by spraying, dipping or painting. It is self-lubricating and highly resistant to creep and wear, and is especially adapted for use as self-lubricating bearing surfaces or elements such as machine tool bed ways, gears, rollers, cams and the like.

9 Claims, No Drawings

THERMOPLASTIC MOLDING COMPOSITIONS

CROSS-REFERENCE TO RELATED APPLICATION

This application is a continuation-in-part of application Ser. No. 345,634, filed March 28, 1973, now abandoned, entitled "Thermoplastic Molding Compositions" of Louis F. Neinart, Ralph R. Saunders and Paul Jeges.

BACKGROUND OF THE INVENTION

1. Field of the Invention

This invention relates to thermoplastic compositions and more particularly to compositions containing (1) a polyamide, (2) polytetrafluoroethylene and (3) inert filler selected from the group consisting of silica and magnesium oxide, which are adapted for use as bearing surfaces or elements and the like.

2. Description of the Prior Art

Thermoplastic molding compositions containing polyamides (nylons) and polytetrafluoroethylene (PTFE), have been proposed for be ring surfaces on gears, rollers, cams and other bearing elements used in machinery such as automobile transmissions and the like. Such materials possess excellent strength (flexural, tensile and tear) and corrosion resistance. However, their inability to resist creep and wear causes them to fail and requires frequent replacement of parts. It would be particularly advantageous if a composition having increased creep and wear resistance was available, but up to the present time no satisfactory composition of this type has been produced. As a result, bearing surfaces and elements formed from compositions of the type described have generally resulted in high maintenance costs.

SUMMARY OF THE INVENTION

The present invention provides a thermoplastic compositions containing (1) a polyamide, (2) polytetrafluoroethylene and (3) inert filler selected from the group consisting of silica and magnesium oxide. Advantageously, the composition can be pressed and sintered, injection molded, compression molded, extruded or readily applied to a substrate by spraying, dipping or painting. It is self-lubricating and highly resistant to creep and wear. For this reason, the composition is especially adapted to use as self-lubricating bearing surfaces or elements such as machine tool bed ways, leaf spring separators, gears, rollers, cams, hinges, ball joints, bushings, seals, gaskets or the like.

Generally stated, the composition comprises (1) a polyamide, (2) polytetrafluoroethylene in the form of discrete particles having an average diameter size ranging from about 5 to 30 microns, said polyamide and polytetrafluoroethylene being present in weight proportion of about 60 to 40 percent of polyamide and correspondingly about 40 to 60 percent of polytetrafluoroethylene, and (3) about 2 to 11 percent by weight of the composition of an inert filler selected from the group consisting of silica and magnesium oxide in the form of discrete particles having an average diameter size ranging from about 0.01 to 15 microns. Preferably, the composition comprises (1) a polyamide in the form of discrete particles having an average diameter size ranging from about 5 to 200 microns, (2) polytetrafluoroethylene in the form of discrete particles having an average diameter size ranging from about 20 to 30 microns, said polyamide and polytetrafluoroethylene being present in weight proportion of about 45 to 55 percent of polyamide and correspondingly about 55 to 45 percent of polytetrafluoroethylene, and (3) about 4 to 8 percent by weight of the composition of the aforesaid inert filler present in the form of discrete particles having an average diameter size ranging from about 0.01 to 3 microns. The polyamide provides a matrix within which the discrete particles of polytetrafluoroethylene and filler are dispersed, as by dry mixing, solvent dispersion methods or the like. An organic pigment, hereinafter described, can optionally be incorporated in an amount ranging from about 0.1 to about one-half percent by weight of the total composition for coloration properties.

The invention will be more fully understood and further advantages will become apparent when reference is made to the following description of the preferred embodiments of the invention.

DESCRIPTION OF THE PREFERRED EMBODIMENTS

The term "polyamide" is used in the specification and claims as a generic term for any long-chain polymeric carbonamide which has recurring carbonamide groups as an integral part of the main polymer chain. Examples of polyamides useful in the composition of this invention include, but are not limited to, polyhexamethylenedipamide, polyhexamethylenesebacamide, polycaprolactam, and polylaurylactam. The preferred polyamide polymer is polycaprolactam.

The polytetrafluoroethylene is available commercially in a powder form containing discrete particles having an average diameter size of about 5 to 28 microns. A powder containing the discrete particles of polytetrafluoroethylene can, alternatively, be made by grinding polytetrafluoroethylene bar stock or scraps and flash molded polytetrafluoroethylene articles. The polytetrafluoroethylene polymer can be a virgin molded powder or sintered, as by subjection to compression and heating in a molding process, to densify the particles and fuse away the hook-like structure thereof.

The pigment suitable for use with the composition of this invention can be any pigment, which remains stable at relatively high temperatures such as those in the order of up to about 370°C., and which will not reduce substantially the creep and wear resistance of bearing material formed therefrom. Organic pigments such as phthalocyanine colorants and the like are preferred as they are less abrasive than inorganic pigments and hence do not appreciably reduce the ability of the composition to resist creep and wear. Among the pigments which may be used is a phthalocyanine colorant composed of 40–75 percent by weight Phthalo-Blue G B-4780, 5–35 percent by weight Opaline Green G-5070 and 15–25 percent by weight Quindo Magenta ERV-8103. Phthalo-Blue G is a copper-phthalocyanine blue pigment described in the Third Edition of the "Color Index", Society of Dyers and Colorers, Yorkshire, England, 1971, as pigment blue 15:3, C.I. No. 74160; Opaline Green is a copper-phthalocyanine green pigment described in the Color Index, supra, as pigment green 7, C.I. NO. 74260; Quindo Magenta is the compound 2,9-dimethylquinacridone described in U.S. Pat. No. 3,298,991, which patent issued Jan. 17, 1967 to Herman Gerson and John F. Santimauro.

The thermoplastic composition of the present invention may be prepared at ambient temperature and pressure by a variety of dry mixing procedures using mixing equipment such as Hobart mixers, Waring blenders, ball mills, colloid mills, sand grinding equipment and the like. While the composition may or may not have a pigment additive, it will be discussed as through there is pigment present therein. The dry mixing procedure preferably involves admixing polytetrafluoroethylene, inert filler, pigment and polyamide together in any convenient order and in the above prescribed amounts for a time interval ranging from about 5 to 20 minutes. The mixing time can vary in proportion to the volume of the mix. For a mix having a volume of about 200 in$^3$, the mixing time is typically about 5 minutes.

Alternatively, the composition may be prepared by a solvent dispersion method involving the steps of (1) dissolving either scrap or virgin polyamide in a liquid which is a solvent therefor at elevated temperatures and a non-solvent therefor at ambinet temperatures, (2) adding thereto, either separately or as a dry-blended mixture, the polytetrafluoroethylene inert filler and pigment, (3) agitating the solution (4) precipitating the composition by cooling, (5) separating the solvent from the solids and (6) drying the composition carefully to prevent undue oxidation. The solvent must be capable of dissolving the polyamide and incapable of dissolving the polytetrafluoroethylene, inert filler and pigment. Solvents such as ethylene glycol and water have been successfully used. The preferred solvent is ethylene glycol which effects dissolution of the polyamide at temperatures of about 170°C. and precipitates the composition at temperatures of about 110°C. in $N_2$ atmosphere. Both the temperature and pressure required for the dissolving and precipitating steps can vary with the type of solvent used, as will be understood by those skilled in the art.

Another method by which the composition may be prepared is a solvent dispersion method involving the steps of: (1) dissolving either scrap or virgin polyamide in a solvent (2) adding thereto, either separately or as a dry-blended mixture, the polytetrafluoroethylene, inert filler and pigment, (3) agitating the solution, (4) precipitating the polyamide and other solids with alcohols, aldehydes or ketones, (5) separating the solvent from the solids and (6) drying the composition. The solvent must be capable of dissolving the polyamide and incapable of dissolving the polytetrafluoroethylene, filler and pigment. A particularly suitable solvent in trifluoroethanol, which effects dissolution of the polyamide at room temperature, although the dissolution process will proceed more rapidly with an increase in temperature.

Upon completion of the dry mixing or solvent dispersion process, the polyamide of the composition provides a matrix having the discrete particles of polytetrafluoroethylene, inert filler and pigment dispersed therethrough in a substantially uniform state of dispersion. The melting points of the polytetrafluoroethylene (325°C.) and the inert filler (1600°–1750°C.) are considerably higher than the melting point of the polyamide (215°C.) in which the polytetrafluoroethylene and the inert filler are dispersed. Hence the polyamide matrix is rendered flowable at a temperature lower than the sintering temperature for the polytetrafluoroethylene and the inert filler and preferably at temperatures ranging from about 240° to 340°C. At these temperatures the particles of polytetrafluoroethylene and inert filler have not changed substantially in physical character and are still in discrete form dispersed throughout the flowable polyamide. Thus, the polyamide polymer advantageously functions as a carrier material which is easily injection moldable, whereby the desirable properties of the polytetrafluoroethylene and the inert filler can be utilized without causing the latter to become molten during the molding operation.

Injection molding of the composition can be conveniently accomplished using conventional injection molding apparatus and procedures well known in the art. The composition, in the form of a molding powder is simply heated in a melting chamber to a temperature sufficient to make the polyamide flowable, as in the order of about 240° to 360°C. and preferably about 290° to 310°C., and forced by a ram or the like through an injection passage and into a mold cavity. Injection pressures are generally in the order of about 25000 psi. When the composition has cooled and hardened within the mold cavity so as to form a molded product, the ram is retracted and the product is removed from the mold.

Compression molding of the composition is conveniently effected in the customary manner with conventional compression molding equipment. The composition, in the form of a molding powder, is simply pressed with heat in a molding chamber, cooled with pressure to form a molded part and removed from the mold. Pressures within the mold typically range from about 1000 to 2500 psi. Heating temperatures can range from about 240° to 280°C. and preferably from about 250° to 265°C. The pressing time can vary depending on the maximum cross sectional thickness of the molded part. For example, in molding a part having a maximum cross sectional thickness in the order of about 0.5 inch, the pressing time is typically about 20 minutes.

The lower melting point of the polyamide (carrier) makes it especially suited for application to metal and non-metal substrates where reduction of friction is desired. The composition can be electrostatically sprayed on such substrates and then fused thereto either by thermal treatment in an oven or by spraying thereon a solvent for the nylon, such as trifluoroethanol, the solvent being present in an amount sufficient to cause the polyamide to conform with and bond to the substrate. The latter solvent rapidly evaporates at room temperature leaving the composition fused to the substrate. In addition, the composition can be cemented in strip or block form to metal or non-metal substrates using commercially available adhesives such as epoxy resins, cyanoacrylates or the like. Due to its ease of application the composition is readily applied to such metal substrates as spatulas, machine tool surfaces, auto parts and skis as well as non-metal substrates such as skis, toboggans and the like. Further, the composition tends to resist barnacle growth and hence is ideally suited for use as a coating for keels and hulls of marine crafts.

The following examples are presented to provide a more complete understanding of the invention. The specific techniques, conditions, materials, proportions and reported data set forth to illustrate the principles and practice of the invention are exemplary and should not be construed as limiting the scope of the invention.

EXAMPLE 1

A first vessel equipped with a mechanical stirrer was charged at atmospheric pressure and room temperature with 5 g of a finely divided silica (inert filler) having an average particle diameter of 0.012 micron and .5 g of a phthalocyanine pigment comprising Phthalo-Blue G, Opaline Green and Quindo Magenta. These ingredients were vigorously stirred for 5 minutes, during which time the pigment became thoroughly distributed in the filler. A second vessel equipped with a mechanical stirrer was charged at atmospheric pressure and a temperature of −70°C. with 47.5 g of a −100 mesh polycaprolactam and 47.5 g of a finely divided polytetrafluoroethylene having an average particle diameter of 25 microns. The latter ingredients were vigorously stirred for 5 minutes, to produce a free-flowing powder.

The second vessel was then charged with the contents of the first vessel and the combined ingredients were blended for 10 minutes at a temperature of −70°C. A homogeneous powder resulted, which was vacuum dried at 120°C. for 4 hours.

EXAMPLE 2

A first vessel equipped with a mechanical stirrer was charged with 300 ml of an ethylene glycol slurry containing 47.5 g polytetrafluoroethylene, 5 g silica and 0.5 g pigment. The polytetrafluoroethylene, silica, and pigment were of the type described in Example 1. A second vessel equipped with a mechanical stirrer was charged with a 1200 ml ethylene glycol solution containing 47.5 g virgin polycaprolactam. The ingredients of the second vessel were heated with vigorous stirring and nitrogen cover to a temperature of 170°C. during a time period of 20 minutes. The stirring was continued and the temperature was maintained at 170°C. for 5 minutes, during which time the contents of the first vessel were added to the contents of the second vessel. The mixture was cooled with vigorous stirring to room temperature and the resulting slurry was diluted with 750 ml of methanol to decrease its viscosity. The slurry was then filtered and the resulting precipitate was washed with 2500 ml of methanol and vacuum dried for 4 hours at 120°C.

EXAMPLE 3

A vessel equipped with a mechanical stirrer was charged at atmospheric pressure and room temperature with 150 g virgin polycaprolactam and 1770 ml ethylene glycol, thereby bringing the total volume of the combined ingredients to about 1900 ml. These ingredients were heated with vigorous stirring and nitrogen cover to a temperature of 170°C. during a time period of 20 minutes. Upon completion of the heating time period, all of the polycaprolactam had dissolved in the ethylene glycol. The resulting solution was cooled with vigorous stirring to room temperature to quantitatively precipitate all of the polycaprolactum from the ethylene glycol as particles having an average particle size of 10 microns. The slurry was diluted with 950 ml of methanol to decrease its viscosity. The contents of the vessel were then filtered and the resulting precipitate was washed with 2100 ml of methanol and vacuum dried for 4 hours at 120°C.

EXAMPLE 4

A vessel equipped with a mechanical stirrer was charged at atmospheric pressure and room temperature with 2.5 g silica, one-fourth gram pigment and 23.75 g polytetrafluoroethylene. The polytetrafluoroethylene, silica and pigment were of the type described in Example 1. These ingredients were vigorously stirred for 5 minutes, during which time the pigment became thoroughly distributed throughout. The vessel was then charged with 285.5 g of a trifluoroethanol solvent in which 23.75 g polycaprolactam was dissolved. These ingredients were vigorously stirred for 10 minutes to evenly distribute the polytetrafluoroethylene, silica and pigment throughout the slurry. The stirring was continued and the vessel was charged with 500 ml of methanol to precipitate the polycaprolactum from the solvent. The contents of the vessel were then filtered and the resulting precipitate was washed with 500 ml methanol and vacuum dried for 4 hours at 120°C.

EXAMPLE 5

Five micro tensile test specimens were injection molded from the powder of Example 1 using a ram pressure of 20,000 psi, a barrel and die temperature of 340°C. and a mold temperature of 140°C. The tensile properties of the specimens were determined using the test procedure described in ASTM D 1708-70, except that a gauge length of seven-eighths inch and a head speed of 0.05 inch per minute was employed. The tensile properties of the specimens are set forth below:

| Specimen | 1 | 2 | 3 | 4 | 5 |
| --- | --- | --- | --- | --- | --- |
| Tensile Strength (psi) | 5,300 | 5,300 | 4,900 | 4,800 | 5,100 |
| Tensile Modulus (psi) | 283,000 | 280,000 | 275,000 | 283,000 | 269,000 |
| Elongation (%) | 6.3 | 5.6 | 4.9 | 4.6 | 5.5 |

EXAMPLE 6

A polyamide powder was produced in accordance with Example 3 and used in place of the −100 mesh polycaprolactam to prepare a molding powder following the procedure of Example 1. Flexural strength test specimens in the form of rectangular bars each being approximately ⅛ × ½ × 2½ inches were made from the powder in the following manner. The powder was preheated to 150°C. in an oven provided with a nitrogen atmosphere, pressed into shape at 4000 psi in a mold preheated to 150°C. and sintered for one hour at 260°C. in a nitrogen atmosphere. The flexural properties of the bars were determined using the test procedure described in ASTM D 790-71, except that a span of 2 inches and a head speed of 0.02 inch per minute were employed. The bars were also tested for hardness according to ASTM Test Method D 785-70. The average flexural properties and hardness of the test bars are set forth below:

| 500 ml | Flexural strength | 4,900 psi |
| --- | --- | --- |
| | Flexural modulus | 280,000 psi |
| | Hardness (Rockwell) | R100 |

EXAMPLE 7

A polyamide powder was produced in accordance with Example 3 and used in place of the −100 mesh polycaprolactam to prepare a molding powder following the procedure of Example 1. The powder was compression molded at 1000 psi and 260°C. to form disc specimens individually measuring approximately nine-sixteenths inch thick by 2¼ inch in diameter. Each of the disc specimens was machined into a notched Izod Test bar measuring approximately ⅛ × ½ × 2¼ inches. The impact strength of each of the bars was determined using the test procedure described in ASTM D 756-72A. The bars were also tested in accordance with ASTM Test Method D 792-70 to determine their specific gravity. The average impact strength and the specific gravity of the bars are set forth below:

| | |
|---|---|
| Impact strength | .6 foot pounds |
| Specific gravity | 1.56 |

EXAMPLE 8

A molding powder produced in accordance with Example 4 was compression molded at 4000 psi and 260°C. to form block specimens individually measuring approximately ¼ × 178 × 2½ inches. Each of the block specimens was machined into a square bar measuring approximately 0.2 × 0.2 × 2½ inches and tested for compressive creep. The testing procedure used was that described by E. D. Jones, G. P. Koo and H. L. O'Toole in the Fifth Edition of Materials Research and Standards, Vol. 6, May 1966, pp. 241–243, except that the length of each specimen was 2½ inches. Each of the specimens was subjected to compressive loading of 2000 psi for 100 hours at a temperature of 140°F. The average specimen deformation (creep) was 1.6 percent.

Block specimens of the same dimensions as those described above were formed using the procedure and materials set forth in the preceding paragraph, except that the specimens contained about 5% of the total composition of an inert filler composed of magnesium oxide. The specimens were tested for compressive creep in the aforesaid manner by subjecting them to compressive loading of 2000 psi for 100 hours at a temperature of 140°F. The average specimen deformation (creep) is set forth below, together with the average specimen deformation of a test sample machined to the aforesaid dimensions from a commercially available product composed of 25 percent fiberglass and 75 percent polytetrafluoroethylene, the latter sample being included for purposes of comparison.

| FILLER | SPECIMEN DEFORMATION |
|---|---|
| Magnesium Oxide | 3.99% |
| Fiberglass Filled Polytetrafluoroethylene | 8.89 |

EXAMPLE 9

A molding powder produced in accordance with Example 2 was compression molded at 1000 psi and 260°C. to form disc specimens individually measuring approximately nine-sixteenths inch thick by 2¼ inches in diameter. Each of the specimens was machined into a cylindrical rod measuring approximately 1 inch in length by one-half inch in diameter. The compressive strength and compressive modulus of each rod was determined using the procedure described in ASTM Test Method. The average compressive strength and the average compressive modulus of the rods are set forth below:

| | |
|---|---|
| Compressive Strength (at 1% strain) | 3,800 psi |
| Compressive Modulus | 380,000 psi |

EXAMPLE 10

A molding powder produced in accordance with Example 2 was compression molded at 1000 psi and 260°C. to form disc specimens measuring approximately nine-sixteenths inch thick and 2¼ inch in diameter. Each of the disc specimens hereinafter described as bearing material A, was machined into a test bearing measuring approximately ½ × ½ × 0.7 inch and having one end adapted to conform with the surface of a 1⅛ inch diameter shaft. The bearings were carefully weighed and then tested for wear using a test device adapted to hold them in a horizontally opposed position against a rotating shaft at a pressure of 100 psi. A motor connected to the shaft by a suitable linkage caused it to rotate at a constant angular velocity of 84 feet per minute. After the shaft had undergone an angular displacement of 100,000 feet, the bearings were removed and weighed. The weight loss of each bearing was converted to mills of wear per 100,000 feet of shaft displacement.

Another molding powder was produced following the procedure of Example 4, except that the inert filler of the molding powder was composed of 2.5 g magnesium oxide having a particle diameter of 0.025 microns, the polyamide polymer and the polytetrafluoroethylene being maintained in a 1 to 1 weight relationship. The molding powder was compression molded into disc specimens hereinafter described as bearing material B. The disc specimens were machined into test bearings and tested for wear in the manner set forth in the preceding paragraph. The weight loss of each bearing was converted to mills of wear per 100,000 feet of shaft displacement.

The average wear recorded for each of bearing materials A and B is set forth below, together with the average wear recorded for bearing materials D and E, which are commercially available bearing materials and are set forth for purposes of comparison. Bearing material D is an acetal homopolymer marketed under the trademark DELRIN 400. Bearing material E is a 75 percent glass filled polytetrafluoroethylene marketed under the trademark HALON B 1025.

| Bearing Material | Wear (Mils/$10^5$ ft. Shaft Displacement |
|---|---|
| A | 0.09 |
| B | 0.28 |
| D | 20. |
| E | 0.45 |

EXAMPLE 11

Each of bearing materials A, B, D and E was tested for wear using the same procedure described in Example 10, except that the shaft was caused to rotate at a constant angular velocity of 168 feet per minute. The weight loss of each bearing material was converted to mills of wear per 100,000 feet of shaft displacement.

The average wear recorded for each of bearing materials A, B, D and E is set forth below:

| Bearing Material | Wear (Mils/$10^5$ ft. Shaft Displacement) |
| --- | --- |
| A | 0.10 |
| B | 0.12 |
| D | Failed |
| E | 0.34 |

The above data indicates that a thermoplastic composition containing polyamide and polytetrafluoroethylene admixed with an inert filler selected from the group consisting of silica and magnesium oxide, as hereinbefore described, can be pressed and sintered, compression molded or injection molded to form a bearing material which is self-lubricating and is highly resistant to creep and wear. The composition is rendered flowable at a temperature below the sintering temperatures of its polytetrafluoroethylene and inert filler constituents. Hence, the composition can be injection molded using conventional equipment. The above data also indicates the great improvement in mechanical properties achieved by the thermoplastic composition of this invention. When compared with bearings made of fiberglass filled polytetrafluoroethylene or acetal homopolymer, the wear rate of bearings composed of the aforesaid thermoplastic composition decreased significantly. The decrease in wear is achieved without reducing the flexural, tensile, and compessive strength of the bearings and without increasing the cost thereof. As a result, bearing surfaces formed from thermoplastic compositions of this invention afford lower maintenance costs than those previously permitted by bearing surfaces or elements composed solely of polytetrafluoroethylene filled polyamides.

Having thus described the invention in rather full detail, it will be apparent that these details need not be strictly adhered to but that various changes and modifications may suggest themselves to one skilled in the art, all falling within the scope of the invention as defined by the subjoined claims.

We claim:
1. A thermoplastic composition comprising:
   a. a polyamide;
   b. polytetrafluoroethylene in the form of discrete particles having an average diameter size ranging from about 5 to 30 microns, said polyamide and polytetrafluoroethylene being present in weight proportion of about 60 to 40 percent of polyamide and correspondingly about 40 to 60 percent of polytetrafluoroethylene; and
   c. about 2 to 11 percent by weight of the composition of an inert filler selected from the group consisting of silica and magnesium oxide in the form of discrete particles having an average diameter size ranging from about 0.01 to 15 microns.

2. A thermoplastic composition as recited in claim 1 wherein said polyamide is selected from the group consisting of polyhexamethylenedipamide, polyhexamethylenesebacamide, polycaprolactam and polylaurylactam.

3. A thermoplastic composition as recited in claim 1 including about 0.1 to one-half percent by weight organic pigment.

4. A thermoplastic composition as recited in claim 3 wherein said pigment is composed of 40–75 weight percent PhthaloBlue G, 5–35 weight percent Opaline Green and 15–25 weight percent Quindo Magenta.

5. A thermoplastic composition as recited in claim 1 wherein said polyamide and polytetrafluoroethylene are present in weight proportion of about 45 to 55 percent of polyamide and correspondingly about 55 to 45 percent of polytetrafluoroethylene and said inert filler is present in an amount ranging from about 4 to 8 weight percent of the composition.

6. A thermoplastic composition as recited in claim 5 wherein said particles of polytetrafluoroethylene have a size ranging from about 20 to 30 microns average diameter and said particles of inert filler have a size ranging from about 0.01 to 3 microns average diameter.

7. A thermoplastic composition as recited in claim 1 wherein said polyamide is polycaprolactam, said polytetrafluoroethylene has an average particle diameter of about 5 to 30 microns and said inert filler is a finely divided silica present in the amount of about 5 weight percent of the composition and having an average particle diameter of about 0.01 – 3 microns.

8. A low friction bearing element comprising a matrix of a polyamide having dispersed therein (1) polytetrafluoroethylene in the form of discrete particles having an average diameter size ranging from about 5 to 30 microns and (2) an inert filler selected from the group consisting of silica and magnesium oxide and being in the form of discrete particles having an average diameter size ranging from about 0.01 to 15 microns, said polyamide and polytetrafluoroethylene being present in weight proportion of about 60 to 40 percent of polyamide and correspondingly about 40 to 60 percent of polytetrafluoroethylene, and said inert filler being present in the amount of about 2 to 11 percent by weight of the combined polyamide, polytetrafluoroethylene and inert filler.

9. A process for coating a substrate with the composition of claim 1 comprising the steps of:
   a. electrostatically spraying said composition onto a surface of the substrate; and
   b. contacting said surface with a solvent for the polyamide, said solvent being present in an amount sufficient to cause said polyamide to conform with and bond to said surface.

* * * * *